United States Patent Office 3,444,207
Patented May 13, 1969

1

3,444,207
DIMER OF 2,2,3,4,5,6-HEXACHLORO-
CYCLOHEXADIENONE
John E. Franz, Crestwood, Mo., assignor to Monsanto
Company, St. Louis, Mo., a corporation of Delaware
No Drawing. Filed Feb. 6, 1967, Ser. No. 614,000
Int. Cl. C07c 49/48; A01n 9/24
U.S. Cl. 260—586                    1 Claim

ABSTRACT OF THE DISCLOSURE

A dimer of 2,2,3,4,5,6-hexachlorocyclohexadienone which is useful as an insecticide, herbicide and fire-proofing agent.

This invention relates to the dimer of hexachlorocyclohexadienone as a new compound. The dimer of hexachlorocyclohexadienone can be readily prepared by irradiating with a light source of 3000–7500 A., a solution of 2,2,3,4,5,6-hexachlorocyclohexadienone and a suitable solvent such as carbon tetrachloride.

The invention will be more fully understood by reference to the following examples, which describe the dedetailed preparation of the dimer of 2,2,3,4,5,6-hexachlorocyclohexadienone. Such examples are given for the purpose of illustration only, and are not to be construed as limiting the scope of this invention in any way.

Example 1

To a suitable reaction vessel, there are charged 6.0 grams (0.02 mole) of 2,2,3,4,5,6-hexachlorocyclohexadienone (molecular weight 301) and 30 mls. of carbon tetrachloride. The mixture is irradiated with ultraviolet light of 3500 A. for a period of four to nine hours under a nitrogen atmosphere. Light source is a Shrinavsen reactor containing 16 F8T5/BL G.E. lamps. An IR spectral analysis indicated the reaction to be complete. The presence of the major carbonyl constituent is evidenced by the presence of a 5.7 micron band. The solvent is removed under reduced pressure and the residue obtained is further washed with ether. There is obtained 1.4 grams (23% yield) of a white powder product having a 5.7 micron band. After recrystallization from hexane, the compound melts at 173–175° C. The product is identified as a dimer of 2,2,3,4,5,6-hexachlorocyclohexadienone by the following analysis:

Calcd. for $C_6Cl_6O$: C, 23.95; Cl, 70.72; mol. wt. 602.
Found: C, 24.02; Cl, 70.54; mol. wt. 600.

Example 2

Following the procedure of Example 1, a solution of 3.0 grams (0.01 mole) 2,2,3,4,5,6-hexachlorocyclohexadienone and 35 mls. of carbon tetrachloride is irradiated with visible light of 4000–6000 A. for a period of about four hours. Light source is a Shrinavsen reactor containing 16 F8T5/D G.E. lamps. The reaction mixture is concentrated under reduced pressure. The semisolid product is washed with ether to yield 0.7 gram (23% yield) of crystalline dimer. The IR spectral analysis indicates the presence of a carbonyl band at 5.7 microns.

The product of this invention posesses utility in many varied fields, such as in the formulation of insecticides, herbicides and fire-proofing agents. The compound of this invention is a promising insecticide, being active against a variety of insects when applied in the usual amounts and evaluated according to standard techniques. The compound of this invention can be employed for insecticidal purposes by the use of any of the methods which are conventionally employed in the art. For example, the compound can be applied in the form of a solution or dispersion, or can be absorbed on an inert, finely divided solid and applied as a dust. The present compound exhibits herbicidal activity and is especially effective when used in post-emergence applications against dicotyledonous plants according to standard techniques. The compound of this invention is capable of imparting a high degree of fire-resistance to polyesters particularly those compounds that have 15 to 20 percent chlorine in the final polyester.

While this invention has been described with respect to certain specific embodiments, it is not so limited. It is to be understood that variations and modifications thereof may be made without departing from the spirit and scope of the invention.

The embodiments of the invention in which an exclusive property or privilege is claimed are defined as follows:

1. A white crystalline dimer of 2,2,3,4,5,6-hexachlorocyclohexadienone characterized by having a melting range of 173° to 175° C. and a carbonyl band at 5.7 microns.

References Cited

Denniville et al.: Chem. Abst., vol 48, col. 11382h (1954).

Stammreich et al.: Chem. Abst., vol. 49, col. 7388a (1955).

LEON ZITVER, Primary Examiner.

MATTHEW M. JACOB, Assistant Examiner.

U.S. Cl. X.R.

71—123; 204—158; 260—45.7; 424—331